H. A. LACERDA.
FENDER AND TAIL LIGHT SYSTEM.
APPLICATION FILED AUG. 11, 1916.
1,213,505.
Patented Jan. 23, 1917.
2 SHEETS—SHEET 2.
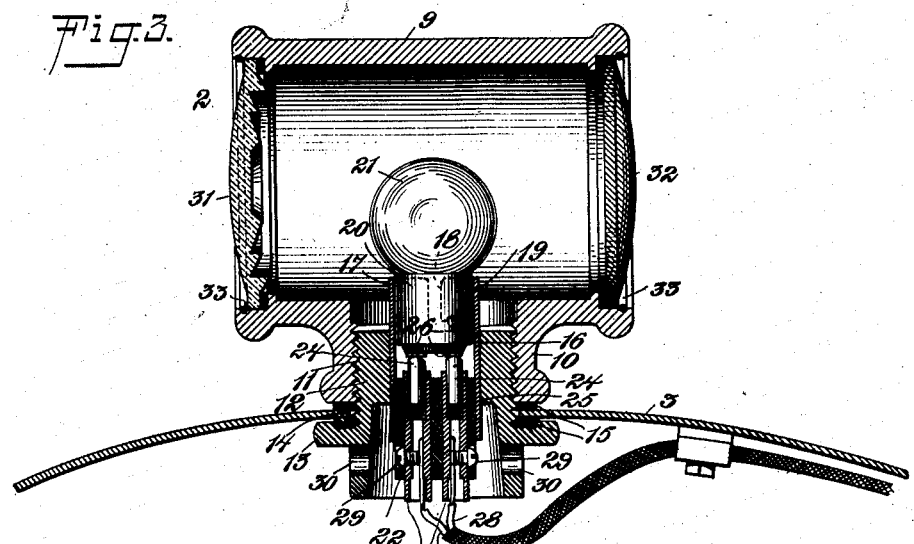
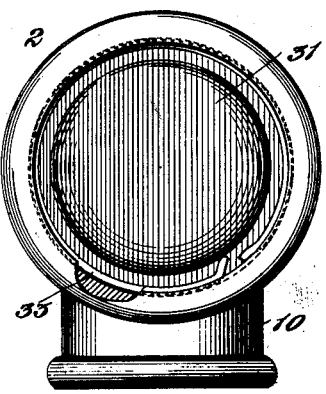
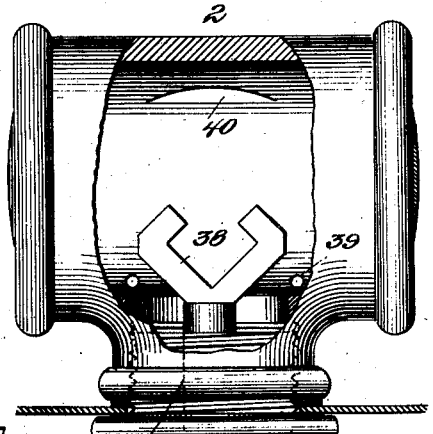
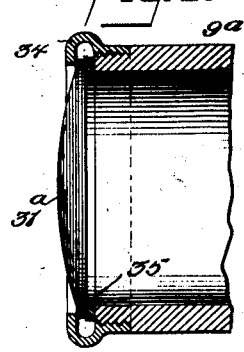
WITNESSES
INVENTOR
H. A. Lacerda
BY
ATTORNEYS

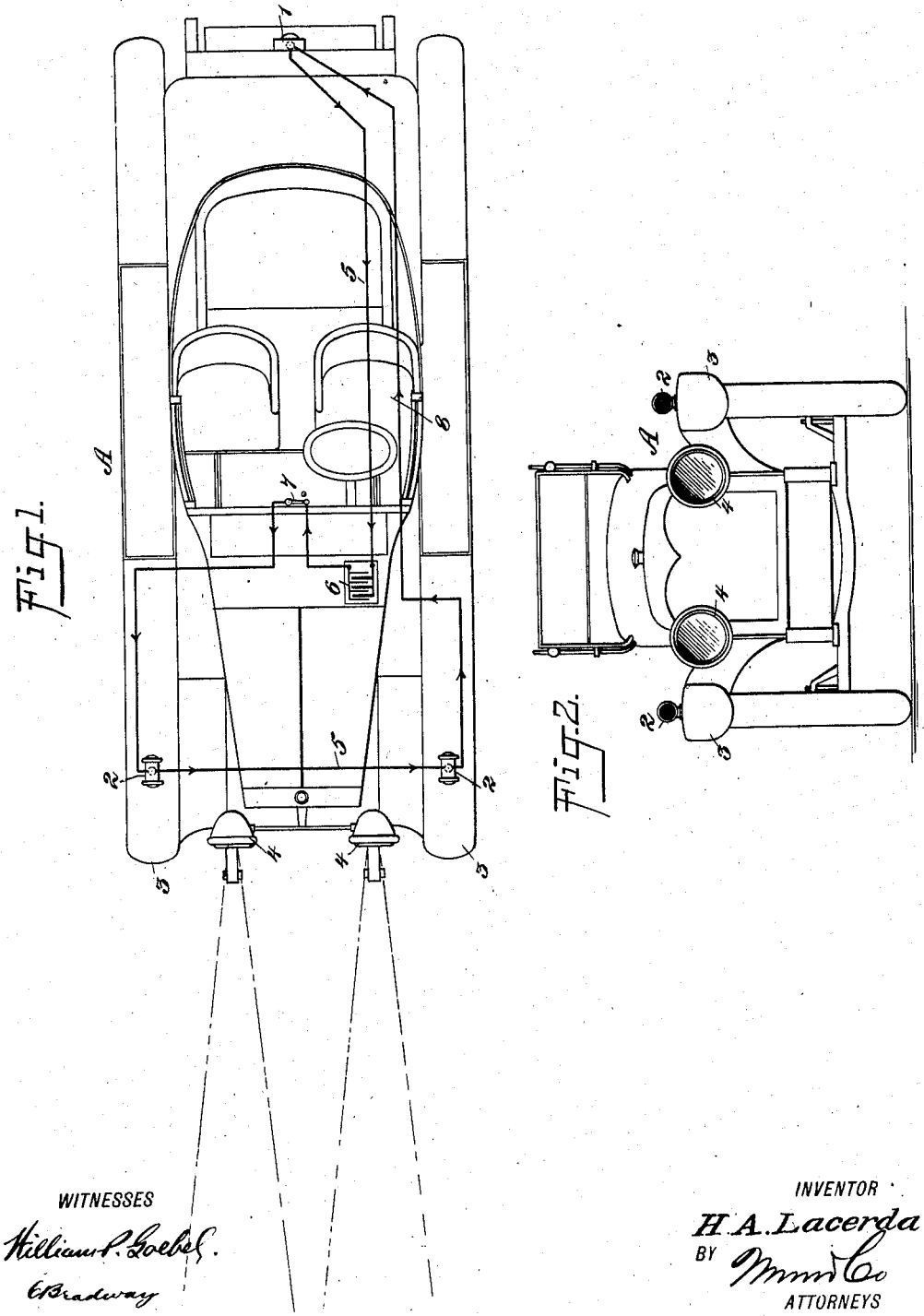

UNITED STATES PATENT OFFICE.

HARRY A. LACERDA, OF SCHENECTADY, NEW YORK.

FENDER AND TAIL LIGHT SYSTEM.

1,213,505.   Specification of Letters Patent.   Patented Jan. 23, 1917.

Application filed August 11, 1916. Serial No. 114,376.

*To all whom it may concern:*

Be it known that I, HARRY A. LACERDA, a citizen of the United States, and a resident of Schenectady, in the county of Schenectady and State of New York, have invented a new and Improved Fender and Tail Light System, of which the following is a full, clear, and exact description.

This invention relates to an indicating light system for automobiles in which lights are arranged on the front fenders to indicate the position of the automobile either when moving or standing, to thereby enable other cars to safely pass.

The general objects of the invention are to provide a novel indicating fender lamp which is of neat and attractive appearance, of durable and substantial design, and of comparatively inexpensive construction.

A further object of the invention is the provision of novel means for mounting the light on the fender and for holding the lamp within the body of the lamp, the light being provided with front and rear glasses, whereby rays of light can be directed forwardly and rearwardly, the forwardly-directed rays serving to indicate to automobiles or other vehicles the position of the car being approached, while the rearward rays, in combination with the tail light, enable the position of the car to be determined from the rear.

Still another object of the invention is to arrange the fender lights so as to serve as indicators for the tail light, this being accomplished by connecting all the lights in series, so that if the circuit should break, the driver will be warned that the tail light is out, because the fender lights would not be emitting any rearward rays, it being understood that the fender lights are positioned considerably in front of the driver's seat and can be readily seen.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a plan view of an automobile showing the fender and tail light system; Fig. 2 is a front view of an automobile equipped with the system; Fig. 3 is an enlarged vertical section of one of the fender lights; Fig. 4 is a front view of the fender light; Fig. 5 is a side view, partly broken away, to show a modified form of the invention; and Fig. 6 is a detail sectional view showing another method of fastening the lenses in place.

Referring to the drawings, A designates an automobile which is provided at the rear with a tail light 1 and at the front with fender lights 2 which are mounted on the front portions of the front fenders 3 of the car, so that the fender lights will lie outwardly from the usual headlights 4. In Fig. 1 the tail and fender lights include electric bulbs, and these are connected in a series circuit 5 containing a source of current 6 and a switch 7.

The fender lights are considerably in advance of the driver's seat 8, so that the said lights can be seen by the driver, and therefore these fender lights serve as indicators as to the condition of the tail light. If the fender lights are out it means that the tail light is also out, and when the fender lights are burning it means that the tail light is burning. Thus, if the circuit should become broken, the current fail, or a lamp filament be destroyed, the fact will be revealed to the driver.

The fender light is constructed as shown in Fig. 3, and comprises a metallic cylindrical body 9 open at both ends and having a central boss 10 at its bottom which is hollow, this boss having an internal screw-thread 11 into which is screwed a plug 12. The plug is formed with an annular flange 13 that is disposed under the fender 3, while the threaded portion of the plug passes upwardly through an opening 14 in the fender and screws into the boss 10. To prevent rattling, rubber or other washers 15 are inserted between the body and fender and between the flange 13 and fender. This plug not only serves as a means for attaching the light body to the fender, but constitutes a support for the lamp.

The plug has an opening 16 in which is disposed a lamp socket 17. This socket is provided with a bayonet joint slot 18 in which interlocks a pin 19 on the metallic base 20 of the electric bulb 21. In the socket is fastened a bushing 22 of insulation that has anchored therein a pair of tubular metallic members 23, in each of which is a movable contact 24 backed by a spring 25. The contacts 24 are arranged to engage contacts 26 in the lamp base. When the lamp is placed in the socket the contacts 24 yield downwardly so that the springs 25 will be under tension, which serves to maintain a firm engagement between the contacts 24 and 26. The circuit wires 27 and 28 lead into the tubular member 23, respectively, and are clamped therein by set screws 29 which can be reached by a screw-driver inserted through openings 30 in the wall of the plug. The wires are fastened to the under side of the fender 3 so as to be concealed from view.

In the front and rear ends of the body 9 of the fender light are lenses 31 and 32 which may be red and green respectively, so that when the car is viewed from in front, when the lights are burning, there will be two red lights in addition to the usual headlights, and when viewed from the rear there will be two green lights and the red tail light. The lenses may be held in any suitable manner, as, for instance, by a spring-retaining ring 33, as shown in Figs. 3 and 4, but if desired a cap ring 34 may be screwed onto the body 9ª of the light to clamp the lens 31ª tight against the gasket 35. In this manner the light will be rain and dust-proof.

When the light is designed for the use of gas, the plug 12ª has a central bore 36 through which extends a burner tube 37 having a burner 38. Air for combustion is admitted to the body of the light through apertures 39, and also in the body are apertures 40 for the outlet of the products of combustion.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. An automobile including a tail light, front fender lights emitting forward and rearward rays, and a series circuit for all the lights, whereby the forward lights serve as indicators of the condition of the tail light.

2. An automobile including a tail light, fender lights positioned in front of the driver's seat and emitting forward and rearward rays, and a series circuit in which all the lights are included, the forward rays being differently colored from the rearward rays of the fender lights.

3. A fender light comprising a body formed of a single piece and of cylindrical shape with open ends and formed with a central depending open boss interiorly threaded, lenses in the open ends, and a plug screwed into the said boss and supporting a light-producing means, said plug being provided with a shoulder which coöperates with the bottom edge of the said boss to form the sole clamping means for securing the said body in place.

4. A fender light comprising a hollow body open at its ends and formed with a depending open boss, lenses in the open ends, a plug fitted on the said hollow boss and supporting a light-producing means, said lug being provided with a shoulder which coöperates with the bottom edge of the said boss to form means for securing the fender light in place.

HARRY A. LACERDA.

Witnesses:
J. W. COLLAMER,
CECELIA CAREY.